Nov. 7, 1950  T. A. KESTELL  2,529,026
APPARATUS FOR PROFILING OPERATIONS
Filed Aug. 21, 1945  14 Sheets-Sheet 4

Nov. 7, 1950     T. A. KESTELL     2,529,026
APPARATUS FOR PROFILING OPERATIONS Filed Aug. 21, 1945     14 Sheets-Sheet 8

Nov. 7, 1950 T. A. KESTELL 2,529,026
APPARATUS FOR PROFILING OPERATIONS
Filed Aug. 21, 1945 14 Sheets-Sheet 9

Nov. 7, 1950     T. A. KESTELL     2,529,026
APPARATUS FOR PROFILING OPERATIONS
Filed Aug. 21, 1945     14 Sheets-Sheet 11

Inventor
Thomas Aubrey Kestell
by Stevens and Davis
his attorneys

Patented Nov. 7, 1950

2,529,026

UNITED STATES PATENT OFFICE 2,529,026

APPARATUS FOR PROFILING OPERATIONS

Thomas Aubrey Kestell, Thurmaston, England, assignor to Power Jets (Research & Development) Limited, London, England Application August 21, 1945, Serial No. 611,853
In Great Britain January 27, 1944

9 Claims. (Cl. 51—101)

The present invention consists in a method of and apparatus for performing turning, milling, grinding and like shaping or working operations to produce articles of irregular contour or profile, and is of particular application, for example, in the profiling of turbine blades.

The invention has been evolved primarily to provide a method of and apparatus for quantity production of a particular form of turbine blade the surface of which, whilst roughly approximating to segments of cylindrical surfaces, are in fact of profile which varies continuously in all three dimensions. The blade design calls for exceptional accuracy both dimensionally and in regard to surface finish, as well as consistency in profile, dimensions and quality of finish as between individual blades of similar design produced on the machine.

It is also advantageous for the apparatus to be in the form of a self-contained compact unit which may be installed on any existing lathe or the like, and it is also necessary to obtain a substantial degree of rigidity to ensure accuracy and consistency in the profile to be formed.

With these and other objects in view, the invention provides a method of and apparatus for profiling according to which the work is rotatably mounted about a work axis, and reciprocatory relative motion is effected between the work axis and the tool, involving rocking about a further axis, the extent of said rocking being varied in accordance with a traversing movement of the work relative to the tool, which movement is either along, or has a component along, either or both of said axes.

According to one form of embodiment, the apparatus according to the invention comprises work-mounting means embodying a primary drive and a secondary drive, of which the primary drive is operable to rotate the work about an axis which is itself rocked arcuately under the influence of the secondary drive. The primary drive and the secondary drive may be positively geared with a common drive input to the work-mounting means. Preferably, the secondary drive operates through a barrel-like profile cam engaged by a follower rigidly coupled to the mounting for the primary drive. In such an embodiment, the work-mounting means can be adapted as a unit for installation on an existing grinding or like machine.

The machine according to the invention is intended to be capable of dealing with the operations of profile turning, milling and grinding the convex and concave faces of the blades, but in preferred production methods the blades are produced from forgings, castings or other preformed shapes, leaving the final profiling finish to be applied by turning, milling and/or grinding the concave and convex faces. In any event, although each machine, in the preferred form, is adapted for all the various operations, production methods will preferably utilise a machine for each operation of the required series.

Preferably a machine according to the invention incorporates a base casting providing sliding surfaces and the usual guides for the tool and work-mounting, the tool being typically a grinding head or any other suitable form of cutting tool, whereas the work-mounting is in fact a profiling head embodying the essential features of the present invention.

According to a further feature of the invention, means are provided for applying a predetermined cut to the work at the end of each traversing movement, such cut being applied either manually or automatically, or both.

According to a still further feature of the invention means are provided for taking up end slack in the mechanism at one end of the traversing movement.

According to a still further feature of the invention means are provided for varying the gear ratio between the profile cam and the work-mounting means.

According to a still further feature of the invention means are provided for giving added rigidity to the work.

The above mentioned and further features of the invention will appear from the description hereinunder which is given by way of example in respect of three forms of embodiment of the invention and illustrated in the accompanying drawings in which.

In Figs. 1–12 which represent one form of embodiment for use when, for example turbine blades are required to be ground on their external convex faces, one, two or more blades 6 (Figs. 9 and 12) are engaged upon a mandrel 1, the whole assembly presenting some rough approximation to cylindrical form.

The means for holding and accurately positioning said blades 6 on the mandrel 1 are described in detail in Patent No. 2,475,900.

The mandrel 1 with the blades 6 accurately positioned on it is mounted co-axially on a work shaft 9 (Fig. 1) which is borne for rotation (anticlockwise as seen from the right hand end of Fig. 1) eccentrically in what may be termed an eccentric sleeve 10 rotatable in a bore 2 in the profiling head body casting 3. Rotation of the eccentric sleeve 10 itself is effected by an arm 15 (rigid with said sleeve) and carrying a cam roll 19 which under the influence of a spring 16 bears on a barrel-like cam 14. The said cam 14 may be designated the profiling cam and is driven for rotation about a cam shaft 17, the effect of said rotation being to impart a rocking movement to the sleeve 10 and consequently to the shaft 9.

Figure 23:
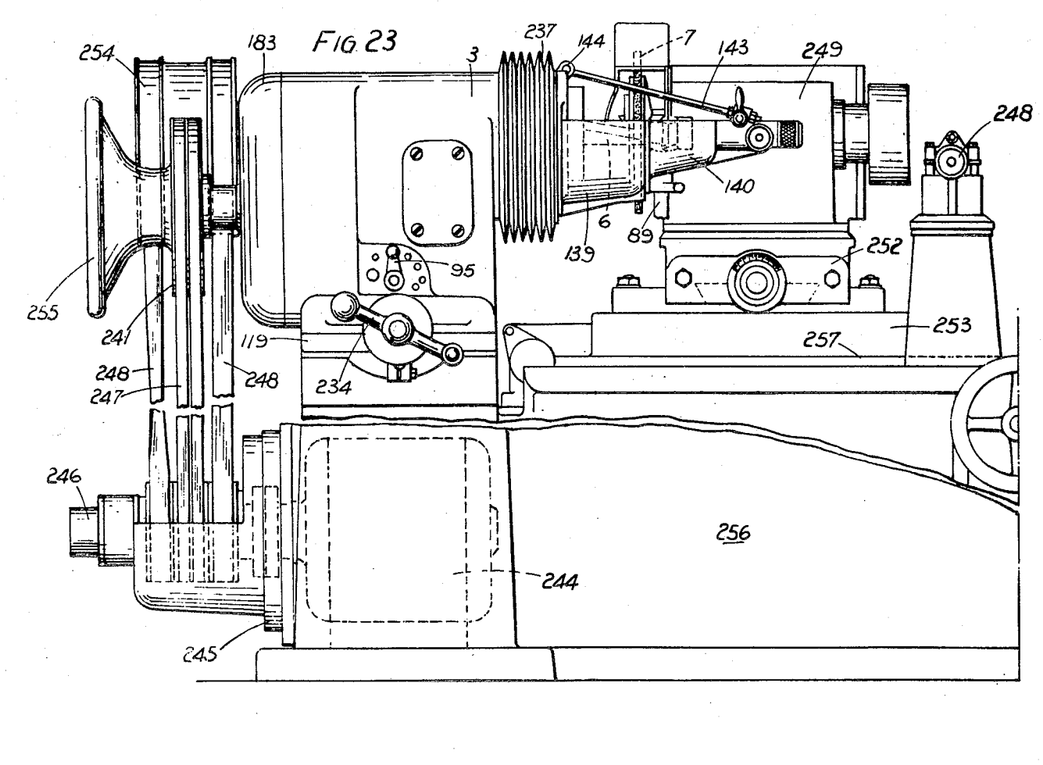
Fig. 23 is a general front view of a machine assembly for external grinding.

Drive is imparted to the work shaft 9 through a spur gear wheel 4 mounted on the cam shaft 17 and engaging teeth 12 provided externally on an annulus 25 journalled on the exterior surface of the eccentric sleeve 10. The annulus 25 is also provided with internal teeth 13, which engage a pinion 18 mounted on shaft 9. Cam shaft 17 is driven through pulley 241 from a main drive comprising an electric motor 244, cone V pulley 245, countershaft 246 and belting 247 (Fig. 23).

Irregularities of profile of the blades 6 are resolved as departures from cylindrical form of the profile presented by the blades 6 to the grinding wheel 7 and thus depend upon the rocking or eccentric movement of the sleeve 10 which is accurately determined by the cam surface 14 and the driving speed relationship between the blades 6 and the cam 14. The form of cam 14 and the gear ratio used between said cam and the blades are necessarily, therefore, worked out with an exceptionally high degree of accuracy to produce the requisite and predetermined departure from cylindrical form about the axis of shaft 9.

In order to traverse the blades 6 across the grinding wheel 7 and at the same time to control the profile of said blades by means of cam 14 it is necessary to impart a traverse movement to sleeve 10 whereby the cam roll 19 is traversed along the surface of cam 14 so that the irregularity of profile required is achieved automatically in the course of this traverse movement. For this purpose the apparatus comprises a lever 26 (Fig. 2) journalled at its lower end to the main casting 3 of the profiling head and carrying at its upper end a cam roll 27 which projects sideways into a slot 28 in the eccentric sleeve 10. The lever 26 is adapted to rock about a transverse axis 29, its rocking movement being controlled by a second cam roll 30 carried on the lever 26 and projecting into a track 91 in the face of a cam 92 directly coupled to a worm wheel 93 (Fig. 3) driven by worm shaft 242 from the main drive input. The track 91 in the face of the cam 92 is of approximately heart-shape or other suitable formation so as to ensure that one rotation of the cam 92 traverses the eccentric sleeve 10 completely in and out within the limits of its movement relative to the profile head 3 and of the movement of the blades 6 relative to the grinding wheel 7. Any usual means may be provided to ensure variation of the speed of traverse, such variation being achieved either under direct control of the operator or on setting up the machine.

At the end of each traverse movement of the blades 6 it is necessary to apply additional cut, i. e. to advance the blades in a radial direction towards the grinding wheel 7. According to the invention this is performed automatically by means of the following arrangement.

An operating handle 94 (Figs. 5 and 7) is mounted on lever 95 fixed to spindle 96 and can be moved radially round the spindle centre between two extremes or intermediately by means of stops 230 (Fig. 7) consisting of removable pins.

Movement of handle 94 moves an eccentric 97 mounted on spindle 96 and forming a stop for lever 98 (Fig. 6) thus limiting the movement of roller 107 carried on lever 98 into the recess 35 in cam 102, the said roller 107 being urged into recess 35 by spring 99 which is fixed to pin 100 on lever 98 and to pin 101 in the profile head 3.

Movement of roller 107 limits the movement of two half pitched pawls 103, 104 mounted on pin 105 on lever 98 and held into engagement with ratchet wheel 106 by springs 231 mounted in a recess in lever 98 and pressing against the tails of said pawls 103, 104. To prevent the ratchet wheel 106 being dragged back with the pawls 103, 104, a plunger 105 in recess 232 in the profile head 3 is held engaged with ratchet wheel 106 by spring 233. The end of plunger 105 has two half pitched teeth 34 (Fig. 8) which engage the teeth of ratchet wheel 106 in the full or half pitched position. Upon ejection of roller 107 from recess 35 of cam 102 the pawls 103, 104, move wheel 106 by an amount substantially equal to the movement of the said pawls, thus rotating shaft 108 in a fixed internally threaded bush 109 engaging with external threads on shaft 108. Consequently said shaft 108 together with bracket 110 and profile head 3 is advanced towards the grinding wheel 7. The ratchet wheel 106 (Fig. 5) is journalled on shaft 108 to which disc 111 is taper pinned by pin 36 and interposed between said wheel 106 and disc 111 is a friction washer 112. The members 106, 111, 112 are held in engagement with one another by means of spring 113 abutting at one end against a collar 114 and at its other end against the boss of ratchet wheel 106 through a spacing washer 115. The collar 114 is retained by locking nuts 116, 117, which are in threaded engagement with shaft 108.

It is necessary to provide some indication to the operator when sufficient total cut has been applied and it is advantageous for the apparatus to prevent automatically the application of additional cut after the application of the final finishing cut.

For this purpose the apparatus according to the invention comprises a stop 118 (Fig. 5) in the form of a hollow plunger adapted to be moved under the influence of a spring 123 and mounted in the profile head slide casting 119 so that it can be clamped by an eccentric 120 mounted on spindle 235 which can be rotated to clamp or unclamp plunger 118 by a wedging action to retain a predetermined longitudinal position. The stop 118 is engaged by a screw 121 carried in bracket 110 and locked thereto by lock nut 122.

On release of plunger 118, spring 123 forces plunger 118 in contact with stop screw 121 to record the inward limiting position of profile head 3. It is then only necessary to reclamp the stop 118 to the profile head slide 119.

A stop screw 121 mounted in bracket 110 is moved forward towards stop 118 at each application of cut. When stop screw 121 contacts stop 118 further movement of profile head 3 is prevented, and therefore rotation of ratchet wheel 106 is unable to rotate shaft 108, and consequently slip will take place between ratchet wheel 106 and disc 111. (A small departure from this setting if required can be obtained by adjusting the setting of stop screw 121.)

If required the automatic feed mechanism may be rendered inoperative and the feed cut applied by hand, or both automatic and manual cut may be applied.

For manual cut, a ball handle 234 is provided rigid with threaded shaft 108 and micrometer dial 236. Cut may be applied by setting the ball handle graduations on the dial 236 against a fixed datum line on the bracket 110 rigid with profile head 3.

The grinding wheel 7 may be mounted on a slide 252 (Fig. 23) which can be moved at right-angles to the direction of movement of the saddle 253 so that the wheel 7 can be moved forward to engage a diamond dresser 248, so that after dressing, the working face of said wheel 7 occupies a constant position relative to the fixed stop 118 on the profile head slide 119.

The apparatus also comprises a dust cover 237.

According to a further feature in the invention, the apparatus comprises means for providing an adjustable gear ratio between the profile cam 14 and the workshaft 9. For this purpose, as shown in Figs. 1-4, the cam 14 is mounted on a sleeve 182 which is journalled on the cam shaft 17 and in the end cover 183.

The cam sleeve 182 has gear teeth 37 which mesh with a pinion 184 mounted on a stud 185 on the profile head 3. Rigid with pinion 184 is a second pinion 186, which in turn meshes with a third pinion 187 rigid with cam shaft 17.

As drawn, the profile cam 14 together with its sleeve 182 will have a gear ratio relative to the cam shaft 17 such that its rotational speed is twice that of the shaft 17. This will enable the profile cam 14 to make a complete revolution while the workshaft 9 turns through 180°, and thus if two blades 6 are mounted on a mandrel 1 carried by the workshaft 9 the whole periphery of the profile cam 14 can be used to control the profile of one blade, and on its second revolution will control the profile of the other blade.

The profile cam 14 together with its sleeve 182 can be directly attached to the cam shaft 17 and thus have a 1 to 1 ratio with the work shaft 9, or by changing two or more of the gears referred to for other gears having a different number of teeth, the profile cam 14 and sleeve 182 can be driven at three or four times the speed of the cam shaft 17 and workshaft 9.

The workshaft 9 is located by means of the following arrangement. At its front end the shaft 9 is journalled in a double conical bearing bush 124. At the rear end, the pinion 18 is secured to shaft 9 through a sleeve 125 and washer 126 by means of nut 90. The sleeve 125 is journalled in a bush 47 (Fig. 2) carried in an extension 128 of the eccentric sleeve 10. A thrust washer 127 is held in contact with the end face of bush 47 by spring 129 which consequently holds the work shaft 9 back into its double conical bearing bush 124.

Figures 13, 14, 15:
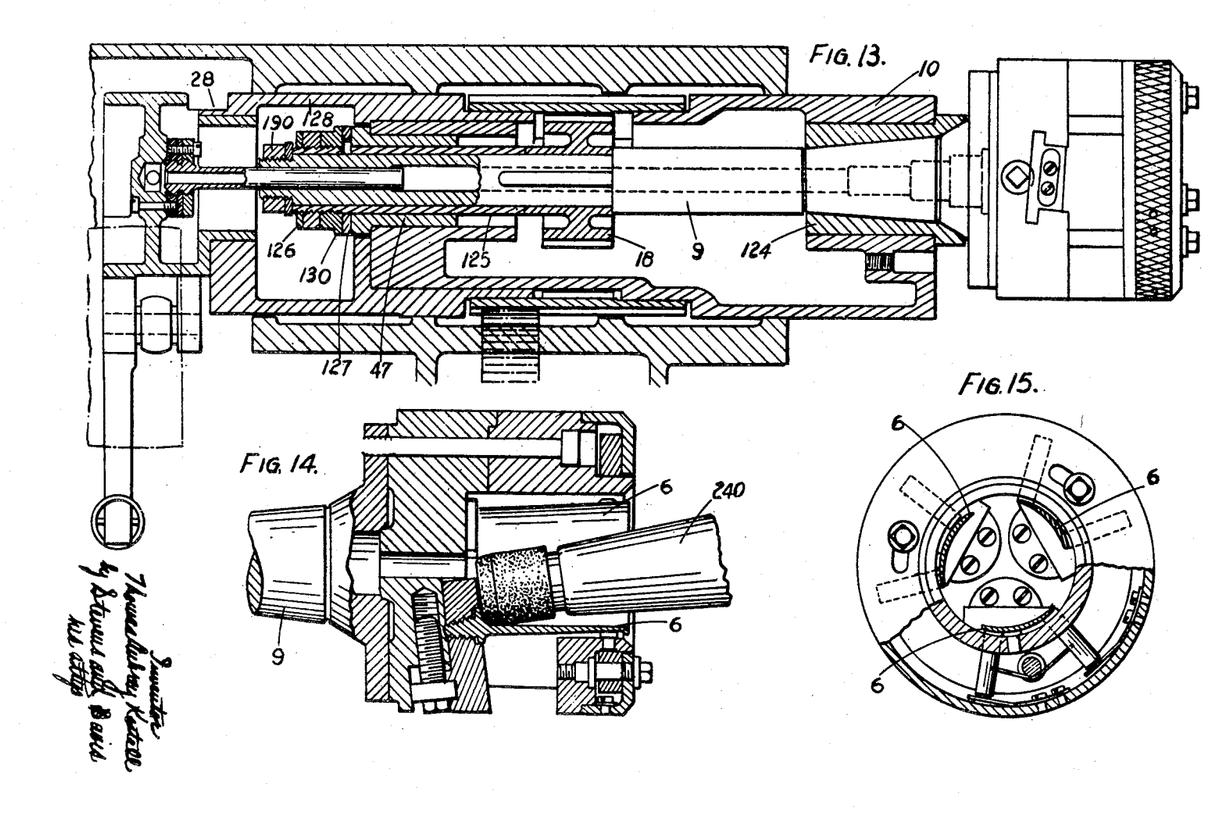
Fig. 13 is a front elevation in section of a second form of embodiment.
Fig. 14 is an enlarged detail of Fig. 13 in plan view.
Fig. 15 is an end view in part section of Fig. 13 turned through 90°.

The above described arrangement for shaft location is used in the case of grinding operations only. In the case of turning operations (which will be described hereinunder) a similar arrangement is used except that the spring 129 is replaced by lock nuts 130 (Fig. 13).

According to a further feature of the invention means are provided to absorb any slack in the traverse mechanism at the time of grinding the end faces of the blade.

Figure 1:
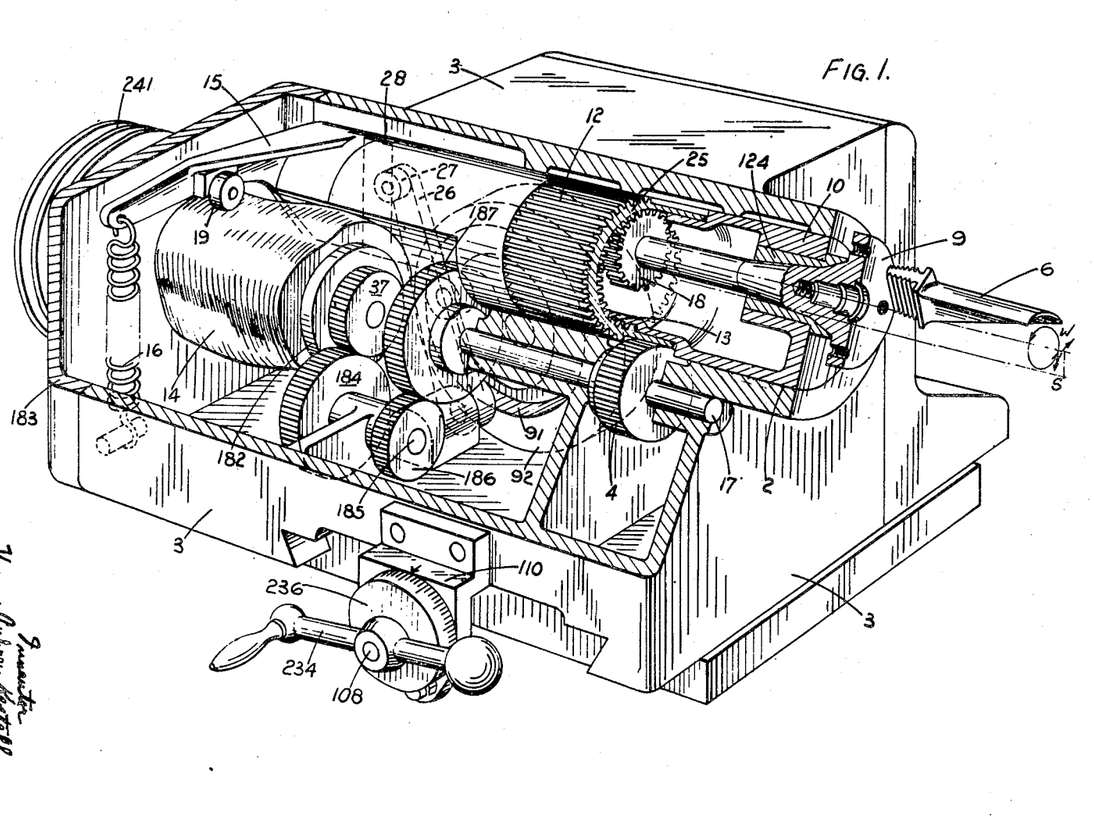
Fig. 1 is a diagrammatic perspective view of a first form of embodiment.
Figure 2:
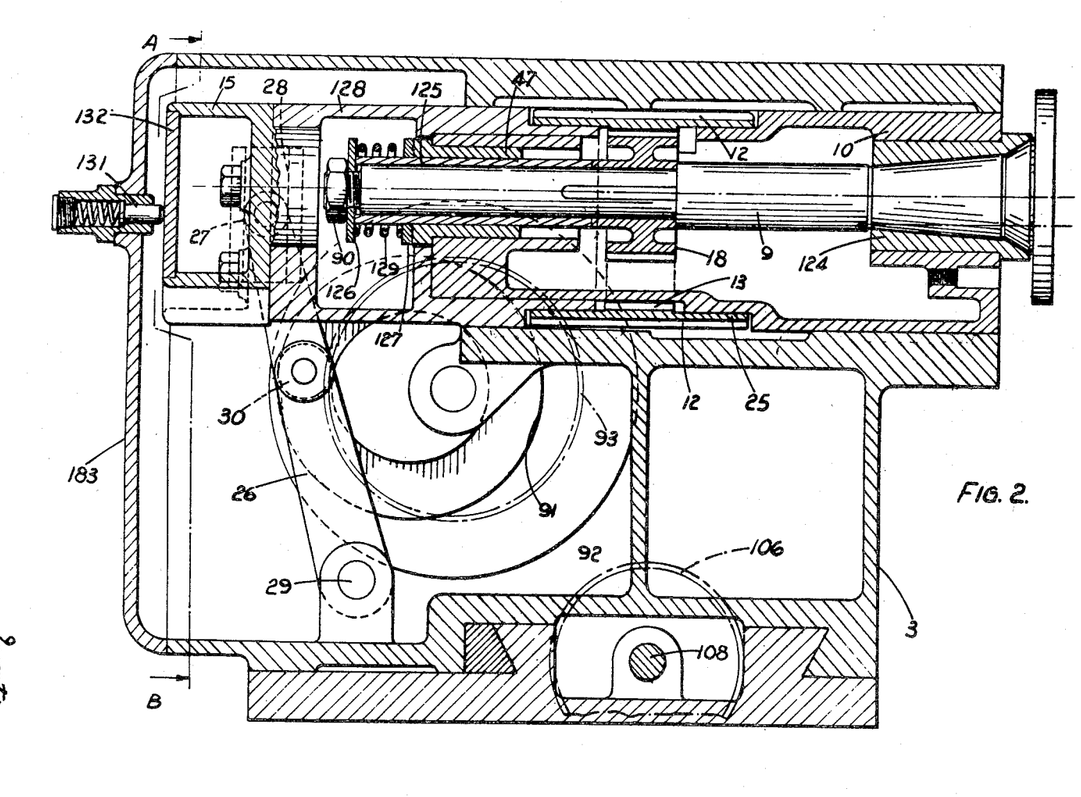
Fig. 2 is a part elevation of said embodiment in section on the line CD of Fig. 3.
Figure 3:
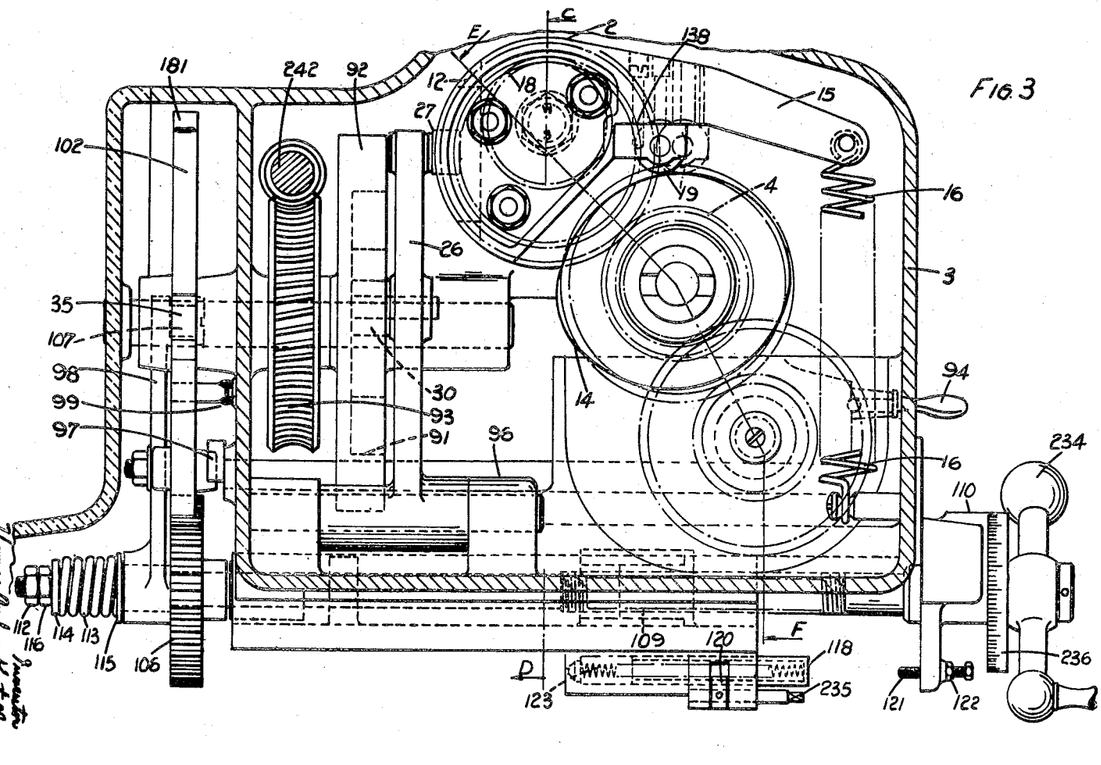
Fig. 3 is an end section on the line AB of Fig. 2.
Figure 4:
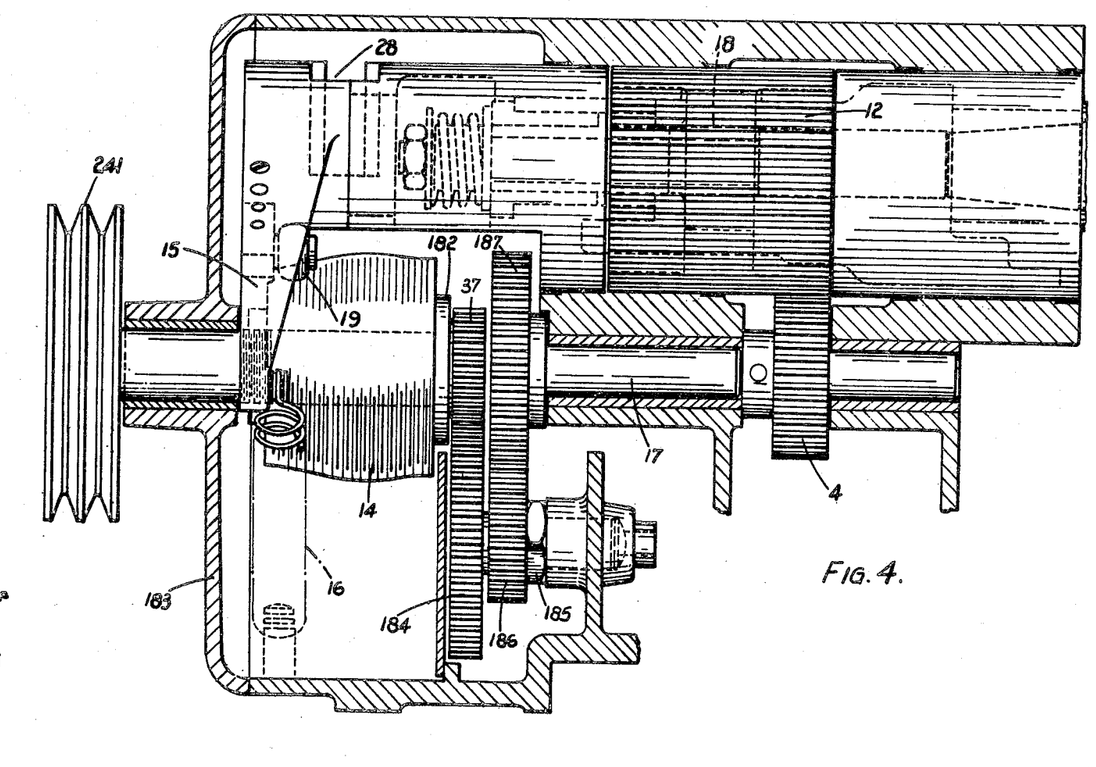
Fig. 4 is a section on the line EF of Fig. 3.
Figure 5:
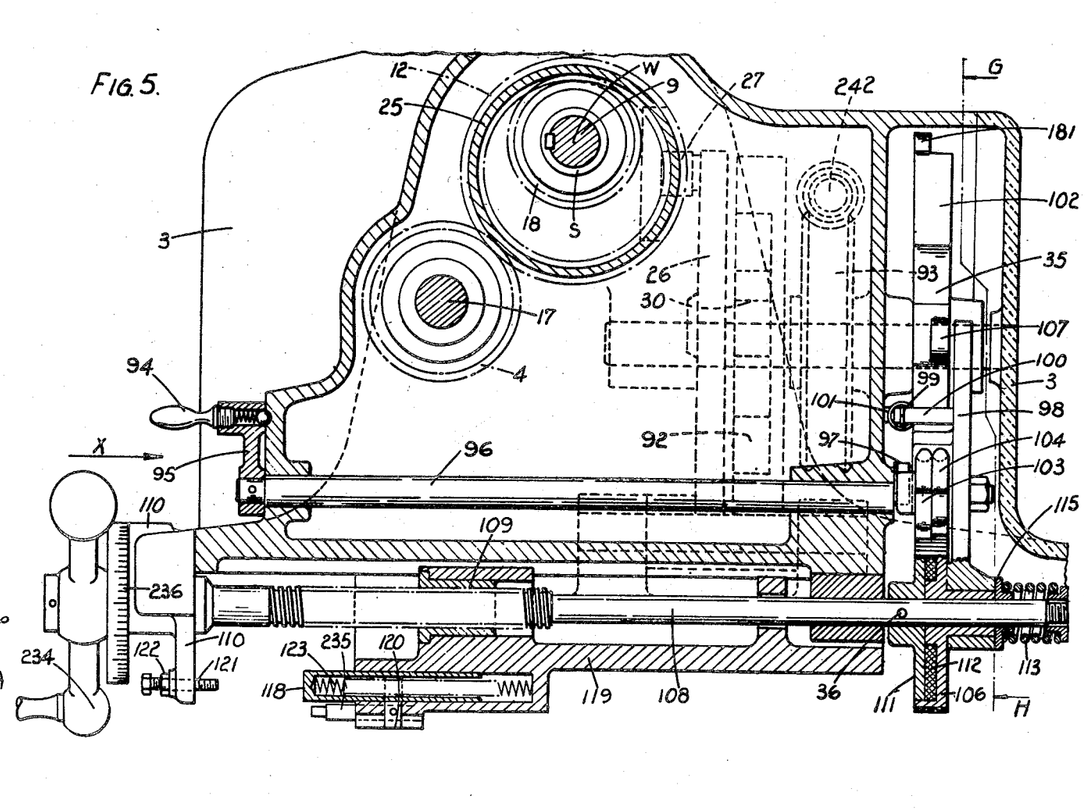
Fig. 5 is a right hand end section on line PQ of Fig. 6.
Figure 6:
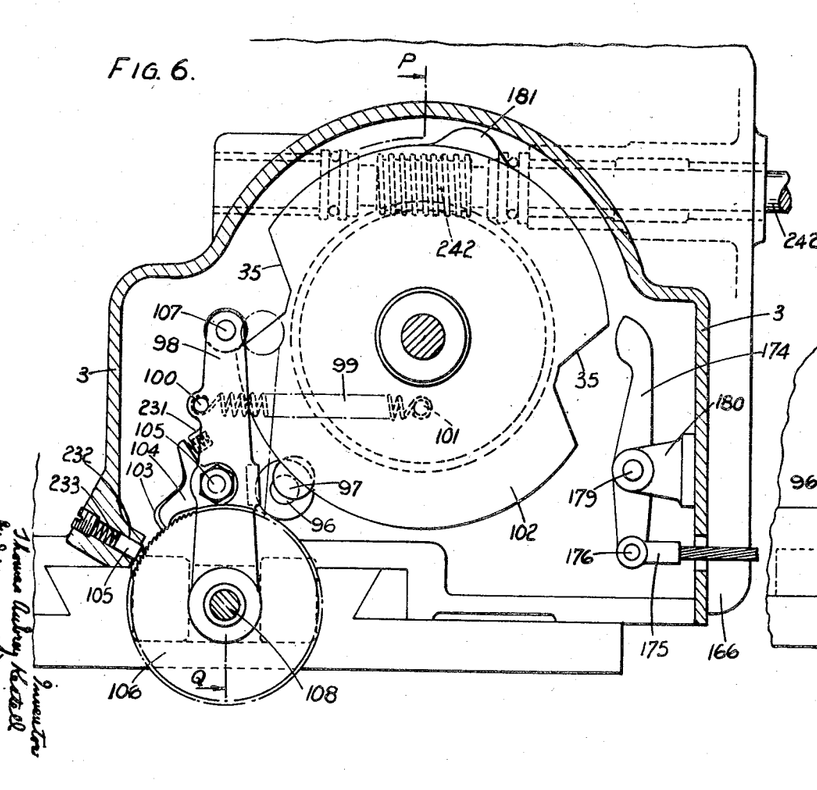
Fig. 6 is a section on the line GH of Fig. 5.
Figure 7:
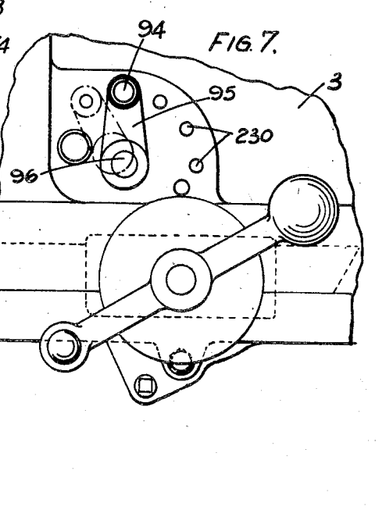
Fig. 7 is a detail view in the direction of the arrow X in Fig. 5.
Figure 8:
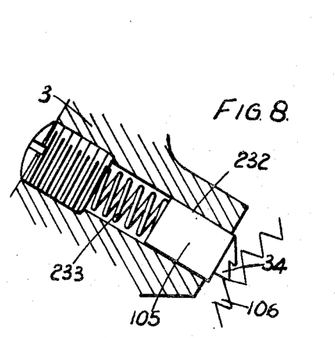
Fig. 8 is a detail view.

In the case of external grinding as illustrated in Fig. 2, a spring pressed plunger 131 is carried in the profile head casing 3 and when the root shoulder of the blade is reached by the grinding wheel 7, plunger 131 abuts against an abutment face 132 carried on the eccentric sleeve arm 15, thus taking up any end slack.

The apparatus according to the invention further comprises a steady device in the form of a steady bracket 139 (Figs. 9 and 12) secured to the eccentric sleeve 10 and carrying a steady bracket 140 provided at its right hand end with a conventional form of lathe type centre 141 (as normally mounted in a lathe tail stock) mounted on the centre line of shaft 9 and located in a conical recess 142 in mandrel 1.

Rigidity of the assembly is obtained by means of a tie bar 143 secured to bracket 139 by a pin 144 and to bracket 140 by adjustable nuts 87, 88 which enable alignment to be maintained between the lathe type centre 141 and shaft 9.

Bracket 140 is in the form of a trough to catch cutting lubricant which is then drained away through pipe 89.

In the case of blades which have extra length and/or a very thin trailing edge, there is a tendency for this edge to lift off the supporting mandrel due to the grinding action. For this purpose a spring loaded steady is provided.

This comprises a disc 150 (Figs. 9-12) mounted adjacent to and slightly in advance of the working face of the grinding wheel 7 (i. e. bearing on the blade 6) and nearer to the root of said blade than the grinding wheel 7. The disc 150 is integral with a spindle 151 and is journalled in a bearing 152 carried at the lower end of a lever 153 fixed to a fulcrum pin 154 which is journalled in a bracket 155 fixed to the grinder head. A rod 156 is attached to lever 153 by a pin 157'. The rear end of rod 156 is attached by pin 159 to lever 160 journalled on pin 161 carried in a bracket 162 which is fixed to the rear of the grinder head 119. The lever 160 is held in engagement with a fixed stop 172 on the grinder head slide 121 by spring 163 which causes disc 150 to be yieldable away from blade 6.

This arrangement ensures that the disc 150 retains its setting relative to the blade 6 irrespective of the diameter of the grinding wheel 7.

In order to allow the root shoulder of the blade 6 to be ground it is necessary for the disc 150 to be removed and subsequently replaced on the reverse traverse of the said blade. To enable this to be done automatically a Bowden cable 166 is attached to lever 160 by means of a shackle 170 and pin 171. A casing 167 for the Bowden cable 166 is adjustably connected to cover 173 (which is bolted to the rear of grinder head 119) by means of an adjusting screw 168 and lock nut 169.

The end of Bowden cable 166 remote from grinder head 119 is connected to lever 174 (Fig. 11) by shackle 175 and pin 176. The casing 167 is adjustably connected to the profile head by screw 177 and lock nut 178. The lever 174 is fulcrumed on a pin 179 carried in bracket 180 attached to the profile head 3 and is adapted to engage with a projection 181 (Fig. 6) on the feed cam 102 in a timing relationship such that the projection 150 will be lifted clear of the blade 6 before its root shoulder reaches the grinding wheel 7 and will be returned to the blade 6 after the latter has travelled back an equal distance subsequent to the grinding of the said root shoulder.

Figure 16:
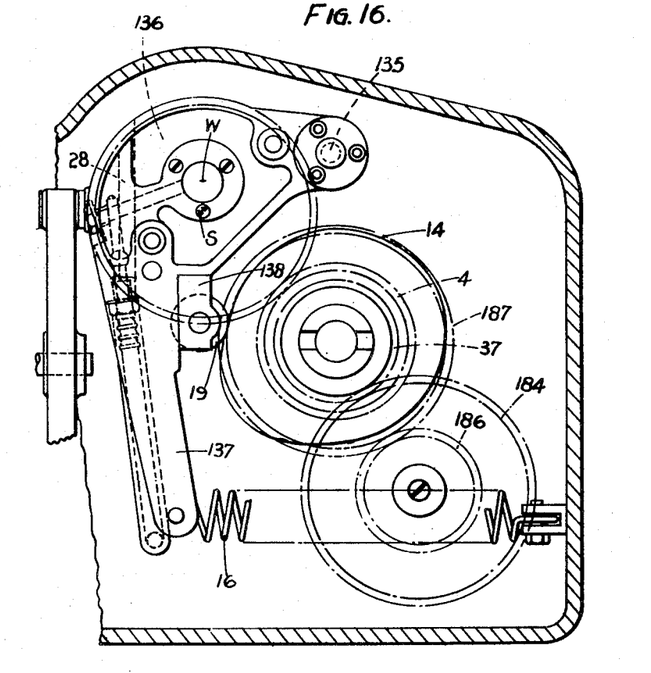
Fig. 16 is a part end view.
Figure 17:
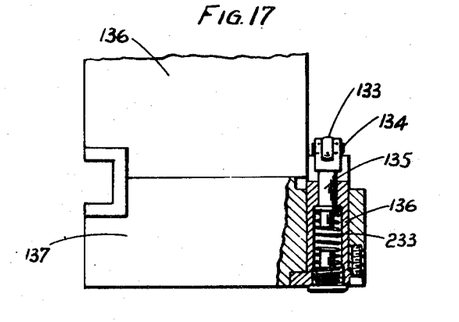
Fig. 17 is a detail view.

The distance between the centre W of workshaft 9 (Figs. 3, 5, 16) and the centre S of eccentric sleeve 10 may be regarded as the eccentric throw of said sleeve. It is advantageous to be able to adjust the ratio of the distance between the said centre S and the centre of roller 19 to the said eccentric throw. For this purpose the roller 19 is mounted in a removable block 138 for which other blocks having any desired value of this ratio may be substituted.

Figs. 13–17 illustrated a second form of embodiment as applied for example to grinding the concave face of a turbine blade, i. e. internal operations.

The general arrangement and principles of operation of the apparatus of Figs. 13–17 are substantially similar to those already described in connection with Figs. 1–12 and differ only as regards the method of mounting the blades 6 on the work shaft 9, the position of the eccentric sleeve arm 15 and the means for taking up end slack.

For internal grinding the blades 6 are mounted in a chuck the construction of which is more fully described in Patent No. 2,475,900.

According to the desired direction of rotation of the work shaft 9 it is necessary to change the position of the roll 19 to ensure that the reaction due to driving the shaft 9 will force the roll 19 against the profile cam 14 and thus assist the spring 16 and ensure that the roll 19 will always be in contact with the cam 14.

To this end the eccentric sleeve arm 15 used for external operations (Figs. 1–12) is replaced by a substantially vertical eccentric sleeve arm 137 (Fig. 16) used for internal operations, but these condtions may be reversed.

The means for absorbing slack in the traverse mechanism when operating on the root shoulder of the blade 6 consist in this case of a roller 133 (Fig. 17) pivoted on a pin 134 in a plunger 135 carried in a sleeve 136 which is mounted on the eccentric sleeve arm 137. At the end of the traverse corresponding to a position for grinding the root shoulder of blade 6, roller 133 abuts against an abutment face (not shown) on the profile head 3, thus compressing spring 233 and holding back the eccentric sleeve 10 to the extent of the slack in the whole of the traverse mechanism.

Figures 18, 19:
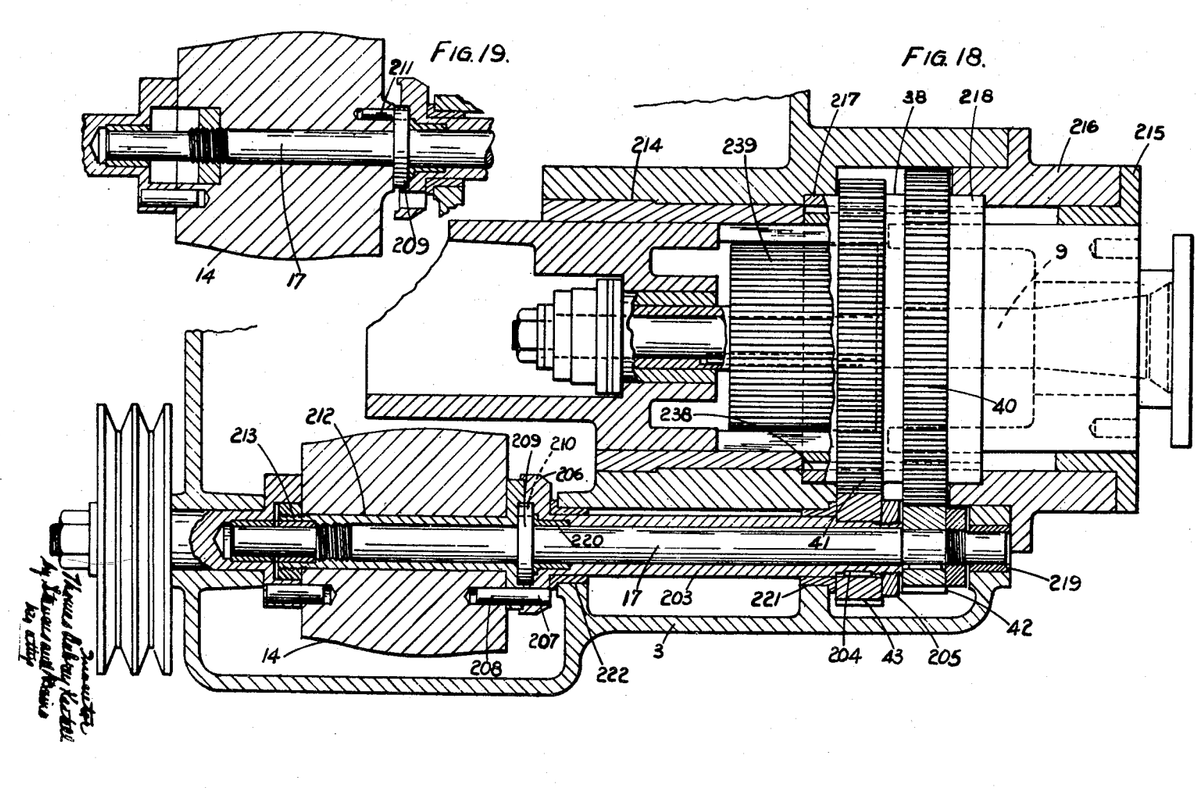
Fig. 18 is a plan view in section of a third form of embodiment.
Fig. 19 is a detail of said embodiment.

Figs. 18 and 19 show a simplified third form of embodiment applicable to both internal and external operations.

The profile cam 14 is carried on a sleeve 212 journalled on cam shaft 17 and is secured to said sleeve 212 by nut 213.

The eccentric sleeve is journalled at the profile cam end on bush 214 and at the work end in a flanged bush 215 carried on a profile head extension 216. Ring gear 38 is journalled in the profile head at 217 and in the profile head extension 216 at 218.

Cam shaft 17 is journalled in a bush 219 carried in the profile head 3 and in a bush 220 mounted in sleeve 203 which is carried in bush 221 and bush 222 in the profile head 3.

A pinion 42 is rigid with camshaft 17 and a pinion 43 is keyed to sleeve 203 by key 204 and nut 205. The sleeve 203 is journalled on the profile cam shaft 17 and extends lengthwise towards said cam and has an end flange 206 provided with a locating aperture 207 engaging with a dowel 208 fixed to the profile cam 14.

The ring gear 38 in this embodiment corresponds to the annulus 25 in the embodiment of Figs. 1–12 and is provided in a similar manner with internal teeth 238, but in this case has two sets of external teeth 40, 41 adapted to mesh with the pinions 42, 43 respectively. The internal teeth 238 engage with the pinion 239 on the workshaft 9.

Thus sleeve 203 rotates with profile cam 14 while cam shaft 17 rotates idly and consequently the ring gear 38 is driven by pinion 43. The profile cam shaft 17 has an annular flange 209 provided with an aperture 210 which can engage with dowel 211 (Fig. 19) carried on the profile cam 14 and in that case cam shaft 17 rotates with cam 14 while sleeve 203 is idle and in this case ring gear 38 is driven by pinion 42.

The ring gear 38 in this embodiment does not take part in the traversing movement which takes place between the internal teeth 238 and the workshaft pinion 239.

Consequently the profile cam 14 being designed to work with a given gear ratio, the position of the dowel 208 or 211 determines automatically the gear ratio which will be used.

For two blades on a chuck or mandrel a 2:1 gear ratio will be required (Fig. 18) and gear 38 must be driven by pinion 43. Therefore profile cam 14 will be required to engage sleeve 203 and dowel 208 will be provided. For 3:1 ratio (Fig. 19), gear 38 must be driven by gear 42, and profile cam 14 will be given dowel 211 so as to engage with cam shaft 17.

This arrangement is more compact, is simpler for gear-changing, and gives better control between the workshaft 9 and cam shaft 17.

Figures 9, 20, 21:
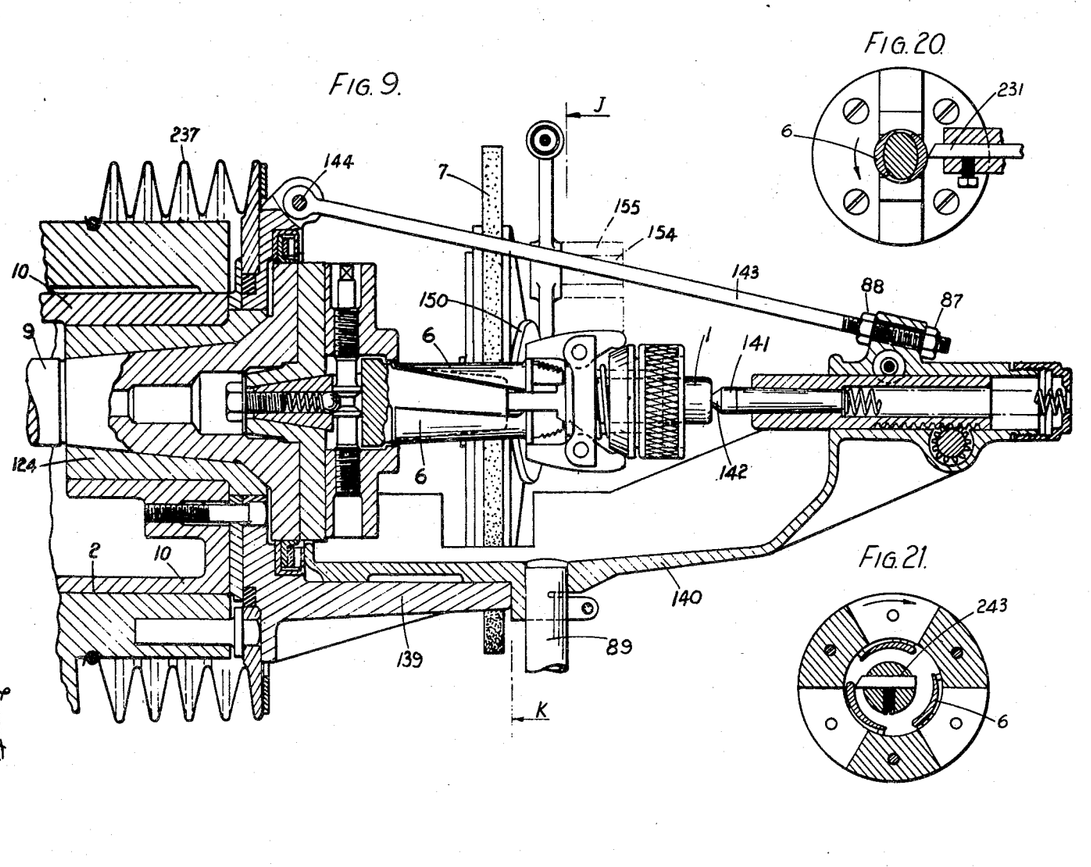
Fig. 9 is a partial view in sectional side elevation.
Figs. 20 and 21 are detail views relating to turning operations.
Figures 10, 11:
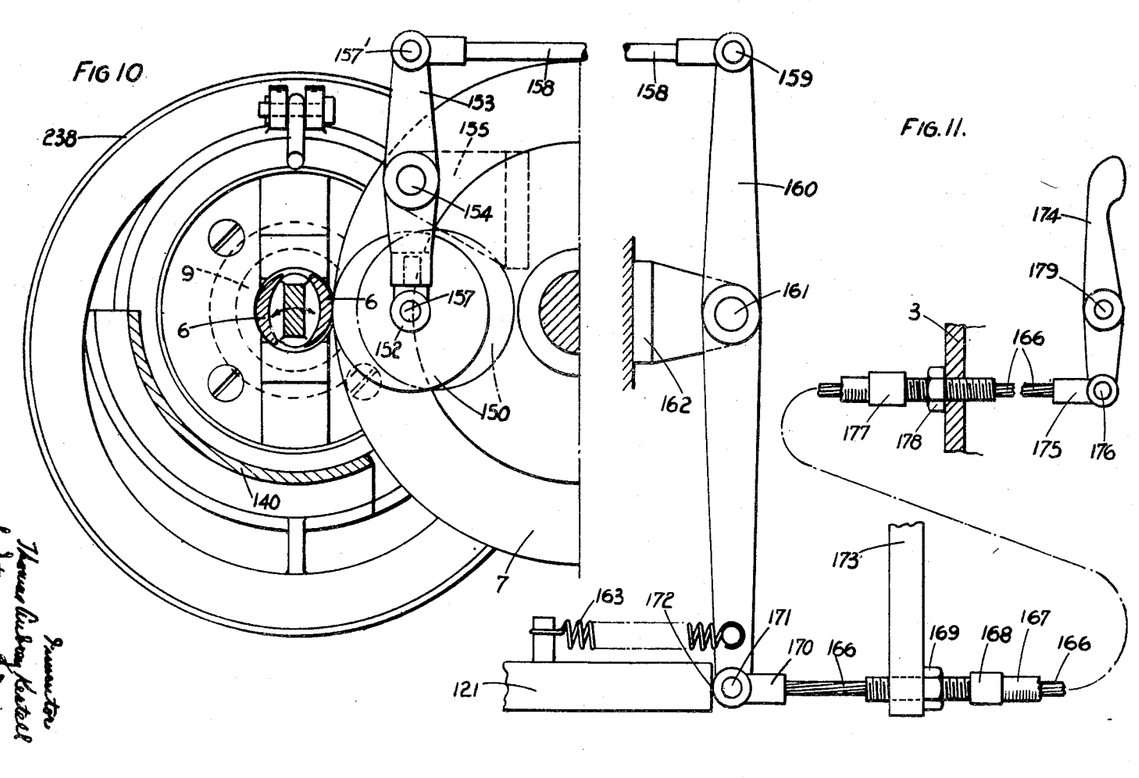
Fig. 10 is a partly diagrammatic section on JK of Fig. 9 with the work turned through 90°.
Fig. 11 is a continuation of Fig. 10.
Figure 12:
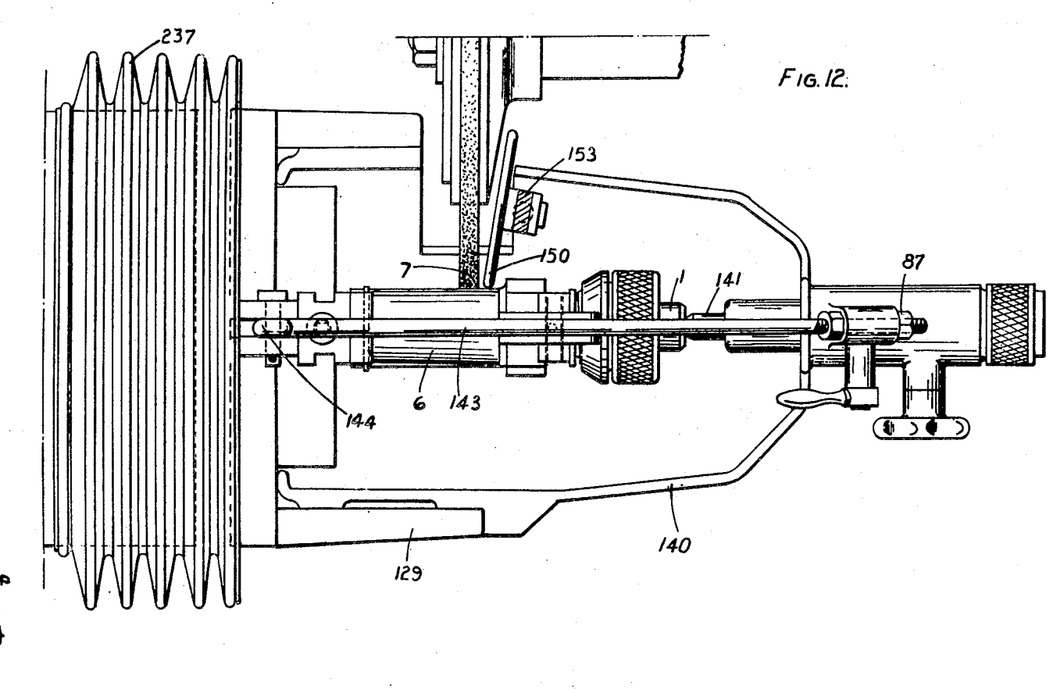
Fig. 12 is a plan view.

If the machine is intended to perform a cutting or other working operation, as distinct from grinding, it is merely a question of replacing the grinding wheel by a suitable tool. For example, for turning operations, as illustrated in Figs. 20 and 21, the grinding wheel is replaced by a turning tool 231 for external operations, or a boring bar 243 for inside turning.

In connection with the grinding operation, the accuracy of form of the grinding wheel is a matter of considerable importance, and a grinding wheel dressing device 248 provided with a diamond (Figs. 22 and 23) is mounted at some appropriate position so that the movement of the grinding head 249 away from the operative position brings the diamond into its correct position for dressing the wheel 7' (Fig. 22) or 7 (Fig. 23), the nature of the dressing device 248 preferably being such that the grinding wheel is dressed on its periphery with a radius corner on the end face. The grinding spindle 240 (Figs. 14 and 22) for internal grinding is preferably mounted so that the said spindle 240 is at a small angle (e. g. about 5°) relative to the workshaft 9 viewed in plan, and as the dresser movement when dressing the periphery of the grinding wheel is parallel to the workshaft, the grinding wheel 7', is dressed to the form of a frustum of a cone; the frustum method of dressing the grinding wheel ensures that it tends to retain its original maximum diameter, which is essential to the profile grinding if irregularities are to be avoided.

Figure 22:
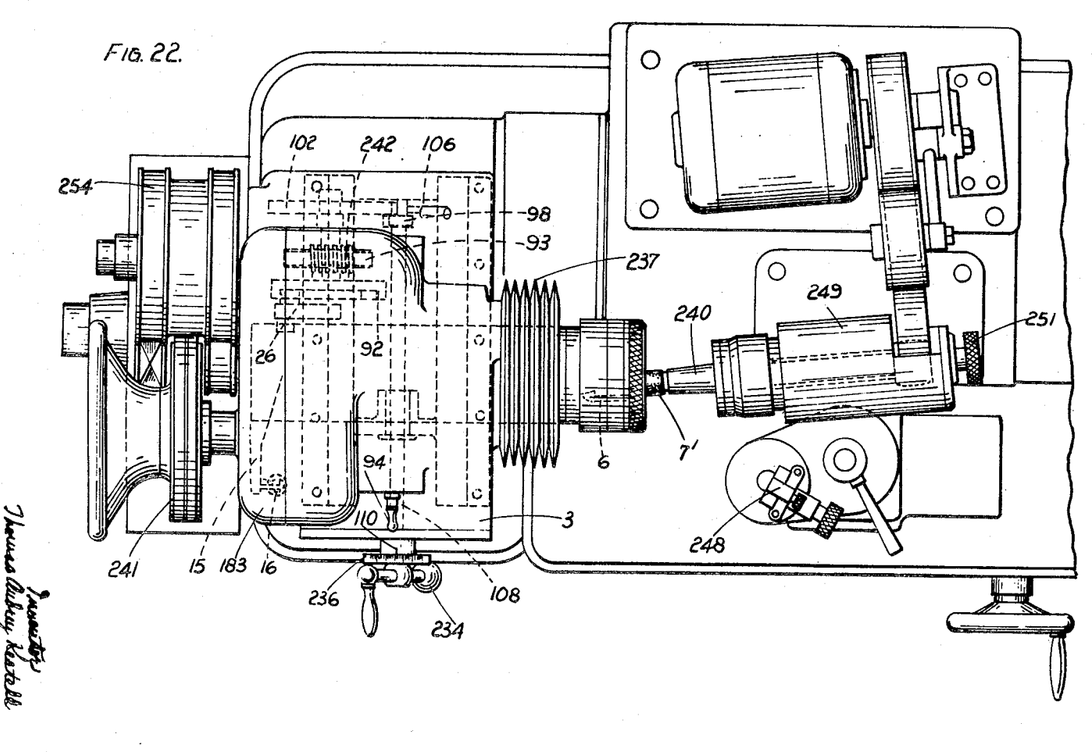
Fig. 22 is a general plan view of a machine assembly for internal grinding.

Figs. 22 and 23 show a preferred arrangement of the various parts of the machine for internal and external grinding respectively. A base casting 256 serves as a support and the saddle 253 can slide over the face 257. An electric motor 244 drives cam shaft 17 via countershaft 246, belting 247 and pulley 241. From said countershaft 246 belting 248 drives a pulley 254 coupled to and thence driving worm shaft 242 for effecting the traverse of the work by the tool. A handwheel 255 is provided for manual operation and acts as a flywheel.

Means are provided for moving the internal grinding wheel 7' forward for example in the form of a screw thread while maintaining its angle of inclination so that the working face of the wheel 7' will always occupy the same position after dressing.

The usual provision is made for lubrication of the mechanism and for supply of cutting lubricant to the working surface of the tool through the workshaft 9 for internal operation and externally for external operations.

If at any time the machine is intended to be adapted for normal grinding and metal-working operations as distinct from profile-grinding and working the eccentric sleeve 10 may be locked to the profiling head with the chuck shaft in a fixed setting, or a cylindrical cam may be used instead of the profile cam. In other words, the fact that the machine is adapted for profile-grinding operations does not prevent it from being used for normal grinding and other working operations.

I claim:

1. In a profiling machine, a work support mounted for rotational movement eccentrically within a housing and for traversing movement together with said housing, means for rotating said work support about a work axis, a tool support, means for traversing said housing together with said work support relative to said tool support, said housing being mounted for rocking about an axis other than the work axis; and means for variably rocking said housing comprising cam means mounted for rotation about a third axis, a follower for said cam means, means for traversing said cam means relative to said follower whereby the follower is moved circumferentially and axially over the surface of said cam means, and means for transmitting the movement of said follower to said housing whereby when the cam follower is moved over the cam surface the amplitude of the rocking movement of the housing is automatically varied in accordance with variations in the profile of said cam means; and means for driving said cam means together with said work support in synchronism.

2. In a profiling machine for forming a three dimensional profile, a tool support, a workshaft borne for rotation in a journal located within and disposed eccentrically with respect to a housing which is itself mounted for rocking about an axis other than the workshaft axis, means for rocking said housing comprising a three dimensional cam mounted for rotation together with said workshaft and a cam follower mounted on said housing, and means for moving said housing longitudinally relative to said cam and tool support whereby the cam follower is moved circumferentially and axially over the cam surface and the amplitude of the rocking movement of the housing is automatically varied in accordance with circumferential and axial variations in the profile of said surface.

3. A machine according to claim 2 comprising means for detachably securing work to said workshaft, and means for yieldably bearing on said work and adapted to be released from said work during one traversing movement of the work and replaced during a subsequent reverse traversing movement.

4. In a profiling machine for forming a three dimensional profile, a workshaft borne for rotation in a journal located within and disposed eccentrically with respect to a housing, said housing being itself mounted in a journal within an outer casing, means for rocking said housing about said journal, the journal of said workshaft being located within the periphery of the journal of said housing, means for detachably securing the work to said workshaft, and means for yieldably bearing on said work and adapted to be released from said work during one traversing movement of the work and replaced during a subsequent reverse traversing movement, said means being adapted to occupy a constant spatial relationship with said work.

5. In a profiling machine for forming a three dimensional profile, a workshaft borne for rotation in a journal located within and disposed eccentrically with respect to a housing, said housing being itself mounted for rocking in a journal within an outer casing, means for rocking said housing about said journal comprising a three dimensional cam having a profile corresponding to the required profile and mounted on a shaft rotatable together with the workshaft, the journal of said workshaft being located within the periphery of the journal of said housing, a pinion rigidly mounted on said shaft, and an annulus journaled on said housing and provided with internal and external teeth of which the said internal teeth drivably engage with said pinion on said workshaft and the said external teeth drivably engage with another pinion rigid with the shaft on which said cam is mounted.

6. In a profiling machine for forming a three-dimensional profile, a workshaft borne for rotation in a journal located within and disposed eccentrically with respect to a housing which is itself mounted in a journal within an outer casing, the journal of said workshaft being located within the periphery of the journal of said housing, and the said housing being associated with a primary drive operable to rotate said shaft and with a secondary drive operable to rock said housing through a cam cooperating with a follower associated with said housing, a pinion rigidly mounted on said shaft and an annulus journaled on said housing and provided with internal teeth and with two series of external teeth of which the said internal teeth drivably engage with said pinion on said workshaft, and the two series of external teeth drivably engage as to one of said series with a pinion rigid with a driven shaft on which said cam is mounted and as to the other of said series with a pinion rigid with a sleeve borne for rotation on said cam shaft, means being provided for securing the said cam selectively either to the cam shaft or to said sleeve on said shaft.

7. In a profiling machine for forming a three-dimentional profile, a workshaft borne for rotation in a journal located within and disposed eccentrically with respect to a housing, said housing being itself mounted in a journal within an outer casing, the journal of said workshaft being located within the periphery of the journal of said housing, and the said housing being associated with a primary drive operable to rotate said shaft and with a secondary drive operable to rock said housing through a cam cooperating with a follower associated with said housing, said housing being provided with a steady device comprising an extension of said housing carrying a semi-circular bracket which is secured to a tie bar by adjustable securing means, the other end of said tie bar being secured to said housing.

8. A profiling machine, a work support mounted for rotational movement eccentrically within a housing and for traversing movement together with said housing, means for rotating said work support about a work axis, a tool support, means for traversing said housing together with said work support relative to said tool support, said housing being mounted for rocking about an axis other than the work axis; and means for variably rocking said housing comprising cam means mounted for rotation, a follower for said cam means, means for traversing said cam means relative to said follower whereby the follower is moved circumferentially and axially over the surface of said cam means, and means for transmitting the movement of said follower to said housing whereby when the cam follower is moved over the cam surface the amplitude of the rocking movement of the housing is automatically varied in accordance with variations in the profile of said cam means; means for driving said cam means together with said work support; and gearing between the work support and the cam means for providing a predetermined speed ratio between the work support and the cam means.

9. In a profiling machine for forming a three dimensional profile, a work support mounted for traversing movement and for rotational movement about a work axis, means for rotating said work support, a tool support, a housing within which said work support is eccentrically mounted and itself mounted for traversing movement together with said work support and for rocking movement about an axis other than the work axis, means for traversing said housing together with said work support, means for mounting for rotational movement a cam of approximately cylindrical form having a profile corresponding to the required profile and varying circumferentially and axially over the cam surface, means to rotate said cam mounting, a follower for said cam supported on a mounting, means for transmitting the movement of said mounting to said housing whereby upon traversing movement of the work support and housing relative to the tool support and cam mounting, the cam follower is moved circumferentially and axially relative to and over the profiled surface of the cam and the housing is thereby rocked to an extent which varies automatically in accordance with variations in the profile of said cam surface; and gearing between the work support and the cam mounting for providing a predetermined speed ratio between said support and said mounting.

THOMAS AUBREY KESTELL.

REFERENCES CITED

The following references are of record in the file of this patent:

UNITED STATES PATENTS

| Number | Name | Date |
| --- | --- | --- |
| 1,515,568 | Fleming et al. | Nov. 11, 1924 |
| 1,633,051 | Trbojevich | June 21, 1927 |
| 2,091,469 | Chace | Aug. 31, 1937 |
| 2,136,491 | Cornell | Nov. 15, 1938 |
| 2,195,065 | Wallace | Mar. 26, 1940 |
| 2,237,583 | Birkigt | Apr. 8, 1941 |
| 2,350,234 | Horton | May 30, 1944 |
| 2,352,608 | Archer | July 4, 1944 |
| 2,364,322 | Shultz et al. | Dec. 5, 1944 |
| 2,373,827 | Halford et al. | Apr. 17, 1945 |
| 2,379,287 | Egleston | June 26, 1945 |

FOREIGN PATENTS

| Number | Country | Date |
| --- | --- | --- |
| 520,277 | Germany | Mar. 12, 1931 |